United States Patent [19]
Gogins

[11] 3,913,698
[45] Oct. 21, 1975

[54] VARIABLE SPEED TRANSMISSION
[75] Inventor: Laird B. Gogins, Salt Lake City, Utah
[73] Assignee: Power-Matic Corporation, Salt Lake City, Utah
[22] Filed: Feb. 1, 1974
[21] Appl. No.: 438,585

[52] U.S. Cl. ............... 180/66 R; 60/330; 180/5 R
[51] Int. Cl.² ........................................ B60K 17/10
[58] Field of Search ............ 60/330, 331, 347, 352; 180/66 R, 70 R

[56] References Cited
UNITED STATES PATENTS

| | | | |
|---|---|---|---|
| 2,645,086 | 7/1953 | Carter | 60/331 |
| 3,298,178 | 1/1967 | Reynolds | 60/352 |
| 3,746,115 | 7/1973 | Bosch | 180/66 R |

*Primary Examiner*—Philip Goodman
*Attorney, Agent, or Firm*—Curtis, Morris & Safford

[57] ABSTRACT

The power transmission is a hydromechanical torque multiplier that is infinitely variable over its operating speed range. It comprises relatively few components, and is highly efficient in its operation. Close control of the output torque and speed is readily accomplished. The torque multiplication and enhancement between the power input and its output drive is a significant feature of the transmission hereof. It may be constructed for small power operation, as well as for hundreds of horsepower.

10 Claims, 5 Drawing Figures

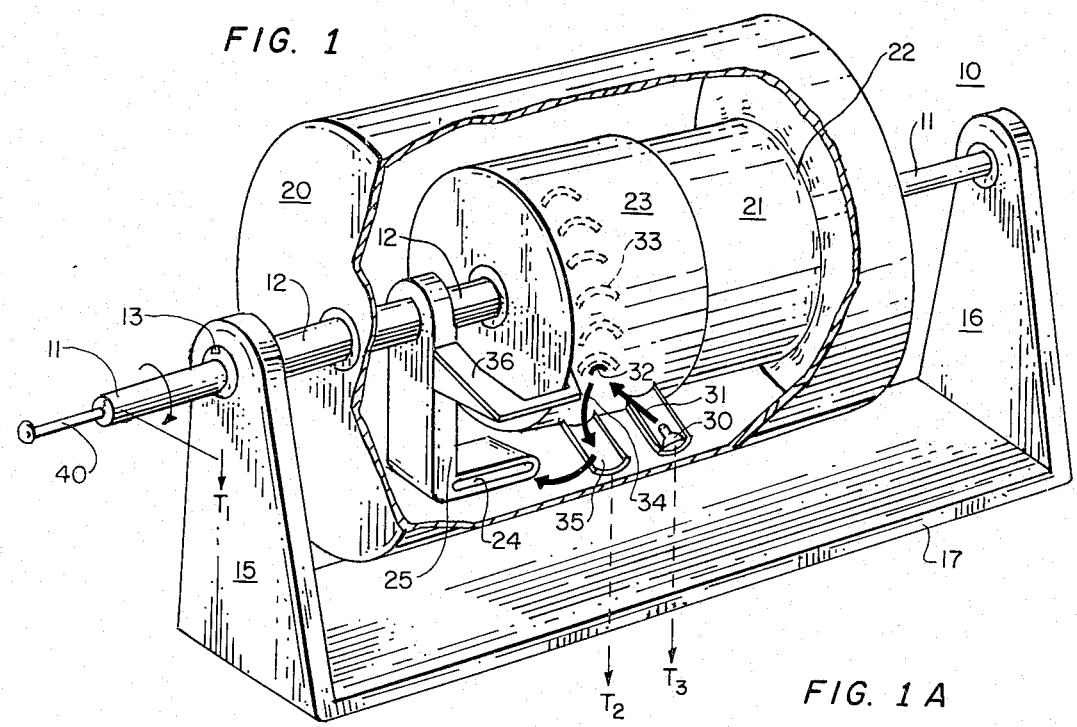
FIG. 1
FIG. 1A
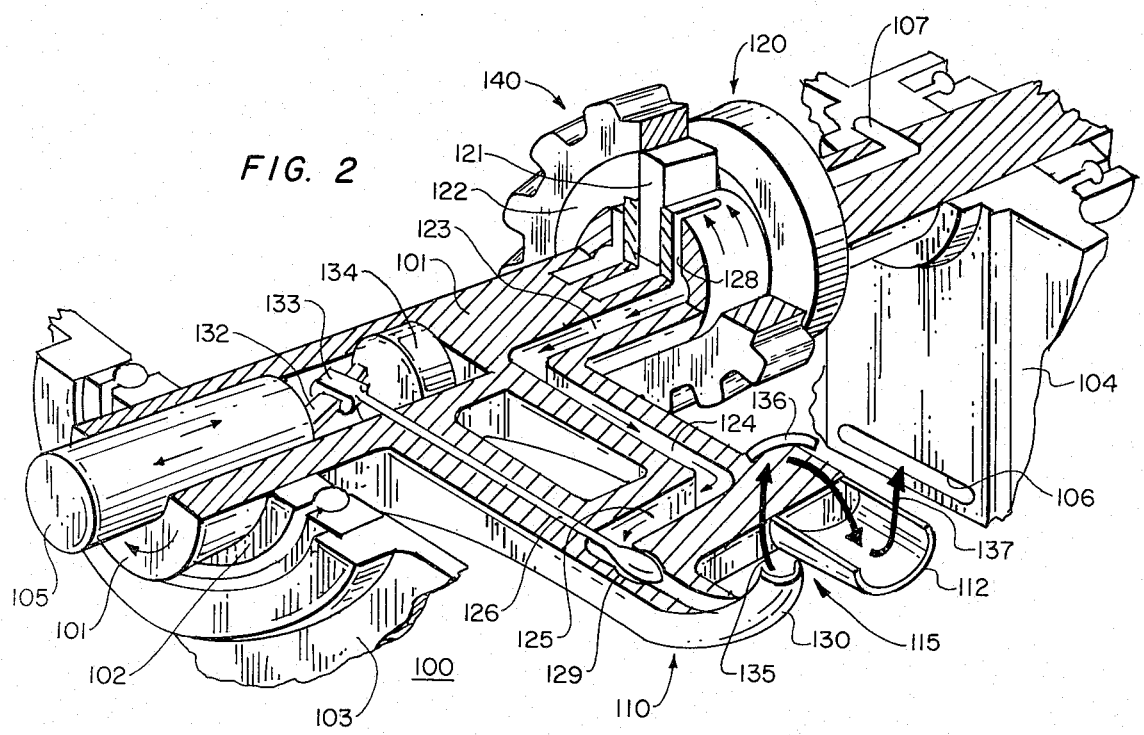
FIG. 2

VARIABLE SPEED TRANSMISSION

BACKGROUND AND SUMMARY OF THE INVENTION

The power transmission requires only hydraulic pumping, and no hydraulic motor. It is thus smaller, lighter in weight, and more economical than prior hydrostatic transmissions. Further, at the high speed ratio of 1:1 no oil is pumped therein. Such arrangement improves operating efficiency. There is no input to output coupling across hydraulic fluid, and oil heating losses are greatly reduced.

The invention transmissions are quieter in operation, and less subject to wear or mal-adjustment. They span a wide variety of advantageous applications, as: industrial variable speed drives; snowmobile and vehicular transmissions; bicycle multi-speed transmissions. In a snowmobile for example, its compactness effects the replacement of the roller chain drive now in general use, saves space, and lowers the center-of-gravity of the snowmobile.

The invention device is a torque converter which comprises an input shaft, siphon means associated therewith for feeding oil from a sump through to a pump, and the oil is ejected as a jet from a nozzle. The oil jet issuing from the nozzle impinges upon circumferentially arranged buckets which reverse the flow direction so as to impinge upon a runner vane. The reversing buckets lie axially between the nozzle and the vane. The runner vane is secured with the nozzle structure whereupon cumulative torque is derived that is added to the input torque. A valve is utilized to control the oil flow from the nozzle. The pump may be a vane type, piston type, or equivalent. The output drive may be gearing about the pump housing, or gears combined with an external housing of the transmission. The latter arrangement is particularly useful as a snowmobile transmission, as will be described.

THE DRAWINGS

FIG. 1 is a schematic showing, in perspective, of the torque multiplication principle of the invention transmissions.

FIG. 1A is a flow diagram of the hydraulic jets in the torque build-up.

FIG. 2 is a cross-sectional view, in perspective, of an exemplary torque converter hereof.

DESCRIPTION OF THE INVENTION

Figure 3:
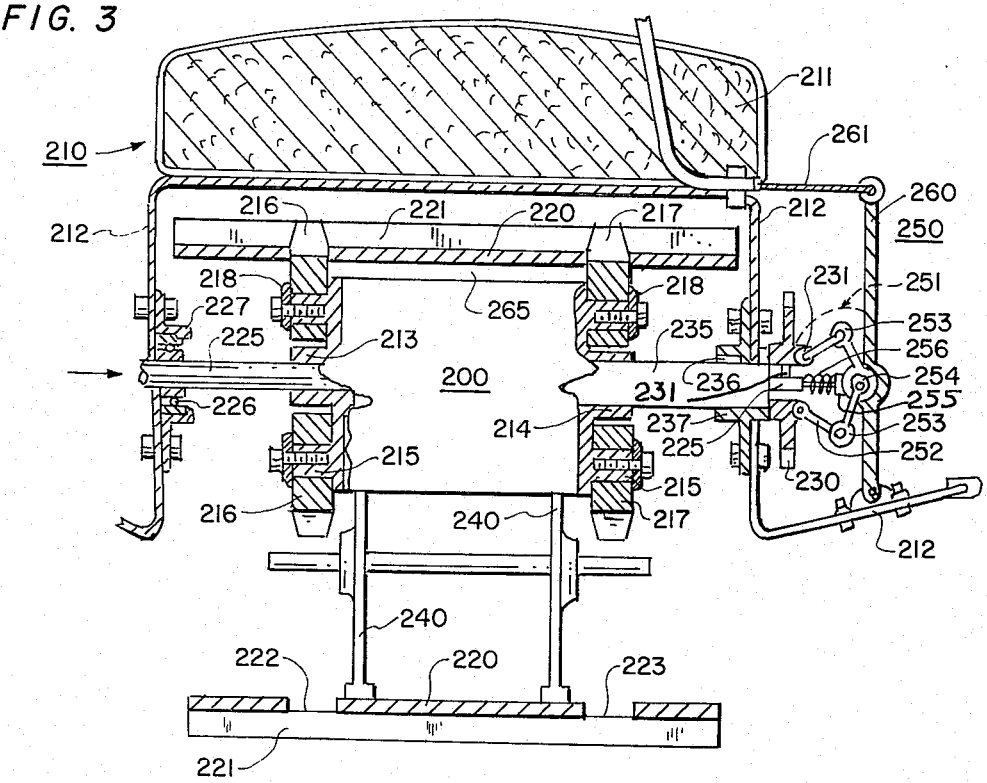
FIG. 3 is a vertical cross-sectional view through a snowmobile that incorporates an invention transmission.

FIG. 1 is a schematic showing of transmission 10 that illustrates how hydro-dynamically generated torques are combined to efficiently effect torque multiplication at the output. The input shaft 11 is journaled within stator shaft 12, which in turn is keyed at 13 to mounting bracket 15. Shaft 11 is journaled on the other side of transmission 10 in mounting bracket 16. A cylindrical housing 20 is integral with hydraulic pump reaction member schematically indicated at 21, across their juncture 22. Housing 20 is the output drive of transmission 10 of this configuration, as used in the snowmobile shown in FIG. 3. The action part of the hydraulic pump is shown at 23. Oil from sump 24 is arranged to flow up through siphon 25 which is affixed to stator shaft 12.

The oil output from pump 21,23 is ejected through a controllable-size orifice of nozzle 30 which is secured with action part 23 of the pump. The size of nozzle orifice 30 is controlled by the axial shifting of a link or rod 40 that is journaled in input shaft 11. Oil jet 31 from nozzle 30 has its direction reversed at 32 by stator blades 33. The stator blades 33 are arranged circumferentially around the pump section 23 and are positioned axially between nozzle 30 and runner vane 35. In transmission 10 the nozzle 30 and runner vane 35 are attached to move with reaction pump section 23. The stator blades are shaped to arrest and redirect the oil jet 31 at 32 into a jet flow 34 against runner vane 35. The reversing blade assembly 33 is mounted stationary, being secured with arms as 36 to the stator (as to siphon 25 or to stator shaft 12). Runner vane 35 again reverses the direction of jet 34, which in turn enters into sump 24. Input shaft 11 operates the pump action section 23.

Hydralic pump 21,23 may be a gear pump, vane pump, piston pump, etc. Also, reaction member 21 of the pump may be fixed to an output shaft, instead of to the transmission housing (20). In the latter case the housing 20 becomes the mounting for the transmission instead of brackets 15,16 that extend from base 17.

The operation of transmission 10 may be considered to be as follows: Restrain the rotation of output member (housing) 20 by a sufficient load while input shaft 11 is rotated by a prime mover. The rate at which the pump functions is proportional to the speed of its action part 23 relative to that of its reaction part 21. The pump 21, 23 in this mode is pumping at its maximum rate that corresponds to the input engine speed set up. Have the prime mover supply a clockwise torque $T_1$ to input shaft 11. The reaction force from oil jet 34 is thereupon in the same direction as input torque $T_1$. The force generated by the action of the oil jet 34 against runner blade 35 is also in the same direction as input torque $T_1$. This blade force, times its distance to the centerline of the transmission is torque $T_2$. The nozzle 30 reaction force times its distance to this centerline is torque $T_3$, in the same direction as $T_1$ and $T_2$. The total torque driving pump 21,23 is the sum of engine input torque $T_1$, plus the torque $T_2$ of the action of jet 34 against runner vane 35, plus the nozzle reaction torque $T_3$.

The more torque supplied at a pump input, the more the pressure that is developed in the pump, as known by those skilled in the art. Per the Bernoulli principle, the greater the pressure, the greater the fluid velocity:

$$v = \sqrt{2P/\rho}$$

where $v$ = velocity, $P$ = pressure, and $\rho$ = mass density of the fluid (neglecting pressure loss due to friction). Since the kinetic energy of an oil jet is proportional to $v^2$, maximum kinetic energy is obtained, and the output torque is maximized by the feeding of the vane and the nozzle torques $T_2$ and $T_3$ back into the input. The reaction torque of the pump, which is the output torque of transmission 10, is equal to the sum of the input torque $T_1$, plus the runner vane torque $T_2$, plus the nozzle torque $T_3$. If the runner vane 35, and/or the nozzle 30 were fixed to the output member of the pump, we still would have a torque multiplying transmission but not as efficient, nor would it develop such a large "stall torque." Because we herein develop such large pressures by these feed-back means, and develop so much energy in such a small quantity of oil, the transmission hereof is much smaller and lighter than other hydrostatic or hydrodynamic transmissions for like torques and powers.

When control rod 40 is moved to close the orifice within nozzle 30, see FIG. 2, there is no place for pumped oil to go and the pump action part 23 and reaction part 21 turn in unison. At this time no nozzle nor runner blade torque are developed, because no oil jet 31 is produced. The transmission input torque $T_1$ thereupon equals its output torque. At intermediate positions of control rod 40, the orifice in nozzle 30 is opened proportionately, and that part of the output torque developed by the nozzle 30 and vane 35 gradually becomes larger until at "stall" it comprises three-fourths to four-fifths of the total output torque.

FIG. 2 is a cross-section through one embodiment of a transmission (100) in accordance with the present invention. Its driven input shaft 101 is journaled in stationary sleeve 102 that is supported in housing section 103. Jet control rod 105 is axialy displaceable within shaft 101. The oil jet generating nozzle 110 extends integrally from drive shaft 101. A plate 111 extends from the nozzle assembly. A runner vane 112 is mounted on plate 111. Vane 112 is spaced apart from nozzle 110 across region 115. Within region 115 is positioned a cylindrical reversing blade assembly (not shown).

Driven shaft 101 operates the action section of oil pump 120. It is a vane type of pump. Its vane 121 is rotated within eccentric cavity 22 and is radially oscillated. The oil flow extends from return oil opening 106 in housing section 104 which communicates with the sump below. The oil is siphoned up into channel 107, and on to pump 120. The oil in pump cavity 122 is pressured into a slot 128 in the pump, and on through channels 123, 124, 125 up to a throat region 129 about head 127 of needle valve 126.

Longitudinal displacement of needle valve 126 via control rod 105 determines the degree of oil flow into the channel 131 in the turned-up tip 130 of nozzle 110. A control link 132 extends between rod 105 and end piece 134, in transverse arrangement. A coupling 133 slides along link 132, and in camlike manner closely controls the position of nozzle head 127 in correspondence with the position of control rod 105. The size and force of the oil jet 135 out of nozzle 130 thus depends on the position of the control valve 126, and the rate of pump 120. Its action section is that driven with vane 121.

The nozzle tip 130 is shaped to direct its jet 135 to the stator blades indicated at 136. The reversing blades (136) redirect the jet onto runner vane 112 as jet 137, which in turn reaches the sump below. It is understood that the stationary reversing blades 136 are in a cylindrical assembly like set 33 of transmission 10 (FIG. 1). As the housing 103,104 of transmission 100 is stationary, the blade set 135 is affixed thereto as a stator assembly. For simplicity, transmission 100 shows only one pump cavity 121 inside the reaction pump housing or output gear 140. In practical use, there are two pump cavities in tandem cut into the gear, the eccentricity of the one being opposed 180° to the eccentricity of the other. Such arrangement smooths out the flow of oil through to the jets. Also, the jet and nozzle assembly is mechanically counterbalanced by a weight (not shown) fixed to drive shaft 101.

As stated hereinabove, for a given pump the oil pressure generated is proportional to the input torque driving it. In prior torqe converters, only the engine drove the pump, and the jets of oil impinged upon runner blades fixed to the output shaft. In the transmission hereof, as 10 and 100, in addition the torques developed on the nozzle 130 and the runner vane 112 combine with the input to drive the pump. This corresponds to the combined torques $T_1$, $T_2$, $T_3$ described hereinabove in connection with the operation of transmission 10. Thus the pump hereof generates more pressure, and there is increased energy in the jet of oil, with larger feedback torques from the nozzle and the vane 112. This process compounds itself to the point where the output torque is up to 15 times greater than the input torque supplied by the engine alone at the input. Because for every action there is an equal and opposite reaction, such multiplied pump input torque equals the reaction torque on the pump body, or output gear of the transmission.

The transmissions of the present invention use far fewer parts than prior art ones, and provide more than twice the torque multiplication. The speed control is infinitely variable, and operating efficiencies over 95 percent. They are relatively very quiet, as well.

In the snowmobile transmission hereof, the output gearing is part of the rotating housing of the transmission. The sprockets that drive the snowmobile track are fastened to the gearing. Thus the entire transmission fits within the track and is driven by direct coupling from the engine, see FIGS. 3,4. Its use eliminates the need for the inefficient belt drives, which also wear poorly.

Figure 4:
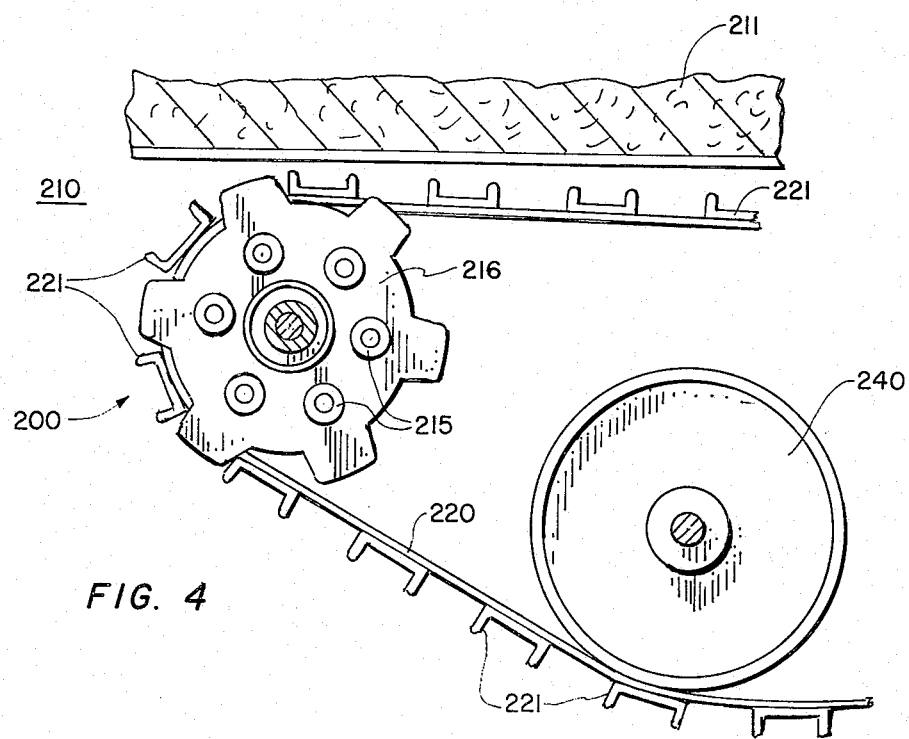
FIG. 4 is a partial elevational view of the snowmobile of FIG. 3.

FIGS. 3 and 4 show an exemplary installation of a transmission hereof (200) in a snowmobile 210. These views show only that portion of the snowmobile 210 near the transmission 200, and also the automatic speed control 250 arranged for its manual over-ride. The seat cushion 211 sets on metal frame 212 of the snowmobile. The transmission 200 has end-bells 213,214 configured with studs 215. These are drilled and tapped for bolts. Track sprocket wheels 216,217 fit over the studs 215. The bolts and washers 218 hold the sprocket wheels 216,217 to end-bells 213,214 to ride with track 220. The basic transmission 200 corresponds to 10 shown in FIG. 1 wherein the outer housing is the output driven member. The sprocket wheels 216,217 are in effect attached to such outer housing in this embodiment. Track 220 is formed in the usual way, with belting to which grouser bars 221 are affixed. While grouser bars 221 extend across the full width of the track 220, there are spaces 222 and 223 between sections of the belting wherein the teeth of the sprocket wheels 216,217 fit. The track sprocket teeth are spaced so as to engage with the grouser bars 221.

The input shaft 225 of transmission 200 is journaled in bearing 226 in a bearing support 227 that is bolted to frame 212. The other end of transmission input shaft 225 is connected to speed control sprocket wheel 230 by key 231. The engine, not shown, couples to drive input shaft 225, to its left end in FIG. 3. A chain, not shown, engages teeth of control sprocket wheel 230, coupling it to a similar sprocket wheel fixed to the snowmobile engine shaft. Stator shaft 235 from transmission 200 is fixed, as by key 236, to mounting bracket 237 that is bolted to frame 212. Bogic wheels 240,240 maintain the weight of the snowmobile onto the track 220.

Flyweight governor 251 has links 252 hinge pinned to sprocket wheel 230, in turn fixed to input shaft 225 on their one end, and to flyweights 253 at their other end. This automatically controls the output speed ratio of the transmission 200. Flyweights 253 also have links 254 pinned thereto, the other ends of links 254 being pinned to central control link 255. A spring 256 is compressed between input shaft 225 and the endcap of control rod 255. Hinge 260 is hinged to frame 212 on one end, and arranged to ride on endcap of control rod 255 in its mid-point. It is tied to control cable 261 at its other end. The forward end of cable 261 is tied to a handle bar lever on the snowmobile. Control rod 255 corresponds to rod 40 of transmission 10. Linkage 260,261 is used to manually over-ride the automatic control action of the flyweight governor. Little force is required to operate this manual over-ride arrangement. Transmission 200 is small enough in diameter to leave a space 265 between track 220 and the transmission. This space 265 allows a build-up of ice on the transmission 200 without the ice pushing the track up on, and perhaps off, the teeth of the track sprockets 216,217.

The transmissions per the present invention may be adapted for bicycles, for example as a substitute for the widely used 10-speed bicycle transmission. The new transmission is infinitely variable as to speed, and torque output to the wheels. It fits inside the hub of the rear wheel. The "output gear" of the transmission becomes the hub of the said rear wheel. The nozzle and blade fit into a thin non-rotating housing fixed to the fork holding the axle. As such transmission for bicycles functions automatically, the rider need not lose momentum as he shifts down while going up a hill.

What is claimed is:

1. A variable speed transmission comprising an input shaft, an hydraulic pump having an action section operatively coupled with said input shaft and a reaction section, a nozzle arranged for rotation with said input shaft and the action pump section, conduits directing fluid to said nozzle from said action pump section, a runner vane spaced from said nozzle and mounted for rotation therewith, and a group of reversing blades positioned between said nozzle and said runner vane to redirect a fluid stream from said nozzle against said runner vane whereby the fluid torques upon said nozzle and said runner vane are cumulative with the mechanical torque exerted upon said input shaft.

2. A variable speed transmission as claimed in claim 1, in which said reversing blades are in cylindrical array.

3. A variable speed transmission as claimed in claim 1, in which said reversing blades are in cylindrical array and coaxial with the input shaft.

4. A variable speed transmission as claimed in claim 1, in which said reversing blades are in cylindrical array and secured with the transmission stator.

5. A variable speed transmission as claimed in claim 1, further including a cylindrical housing enclosing said pump, nozzle, runner vane and reversing blades, and constituting the drive output of the transmission.

6. A variable speed transmission as claimed in claim 5, in which the said housing is secured to for rotation with the reaction section of the pump.

7. A variable speed transmission as claimed in claim 6, further including output gearing mounted with said housing.

8. A variable speed transmission as claimed in claim 1, further including a valve for controlling the fluid stream out of said nozzle.

9. A variable speed transmission as claimed in claim 8, further including a control rod coupled to said valve for setting it externally.

10. A variable speed transmission as claimed in claim 9, in which said control rod is concentric within said input shaft.

* * * * *